US006880051B2

(12) United States Patent
Timpanaro-Perrotta (10) Patent No.: US 6,880,051 B2
(45) Date of Patent: Apr. 12, 2005

(54) METHOD, SYSTEM, AND PROGRAM FOR MAINTAINING BACKUP COPIES OF FILES IN A BACKUP STORAGE DEVICE

(75) Inventor: Michael C. Timpanaro-Perrotta, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 10/099,123

(22) Filed: Mar. 14, 2002

(65) Prior Publication Data

US 2003/0177324 A1 Sep. 18, 2003

(51) Int. Cl.[7] .............................................. G06F 12/00
(52) U.S. Cl. ...................... 711/162; 711/161; 707/202; 707/204; 714/1; 714/6; 714/15
(58) Field of Search ................................. 707/202, 204; 711/161, 162; 714/1, 6, 15

(56) References Cited

U.S. PATENT DOCUMENTS

| | | | |
|---|---|---|---|
| 4,912,707 A | | 3/1990 | Kogge et al. |
| 4,945,474 A | | 7/1990 | Elliott et al. |
| 5,649,196 A | * | 7/1997 | Woodhill et al. ........... 707/204 |
| 5,712,971 A | | 1/1998 | Stanfill et al. |
| 5,794,252 A | | 8/1998 | Bailey et al. |
| 5,845,292 A | | 12/1998 | Bohannon et al. |
| 5,864,849 A | | 1/1999 | Bohannon et al. |
| 5,907,672 A | | 5/1999 | Matze et al. |
| 5,930,824 A | | 7/1999 | Anglin et al. |
| 6,052,764 A | * | 4/2000 | Mogul ........................ 711/162 |
| 6,115,721 A | | 9/2000 | Nagy |
| 6,397,351 B1 | | 5/2002 | Miller et al. |
| 6,463,513 B1 | * | 10/2002 | Bish et al. .................. 711/161 |
| 6,546,472 B2 | * | 4/2003 | Atkinson et al. ........... 711/156 |

FOREIGN PATENT DOCUMENTS

EP 0917060 10/1998

OTHER PUBLICATIONS

Barnett, T., K. McPeek, L.S. Lile, and R. Hyatt Jr. "A Web-based Backup/Restore Method for Intel-based PC's." Proceedings of the Eleventh Systems Administration Conference (LISA XI), Published: Berkeley, CA, 1997, pp. 71-77.

Deconinck, G., J. Vounckx, and R. Lauwereins. "The Consistent File-Status in a User-Triggered Checkpointing Approach." Parallel Computing: State-of-the-Art and Perspectives, Amsterdam, Netherlands; Elsevier. 1996. pp. 471-478. (Abstract).

IBM, Corporation, "Application Checkpoint Control". Technical Disclosure Bulletin, vol. 29, No. 4, Sep. 1986, pp. 1851-1852.

(Continued)

*Primary Examiner*—Donald Sparks
*Assistant Examiner*—Bao Q Truong
(74) *Attorney, Agent, or Firm*—David W. Victor; Konrad Raynes & Victor LLP (57) ABSTRACT

Provided is a system, method, and program for maintaining a backup copy of files in a primary storage device in a backup storage device. The files in the primary storage device are capable of being restored from the backup copy of the files in the backup storage device. An association of one of a plurality of priority values is maintained for each file in the backup copy in the backup storage device. The priority value associated with each file in the backup copy of the files is used to determine the order in which the files in the backup copy are restored from the backup storage device to the primary storage device.

46 Claims, 4 Drawing Sheets

OTHER PUBLICATIONS

IBM, Corporation, "Saving Essential Object Information Through Java Object Serialization and Java Compression, Storing the Java Object Essentials on a Non–Java System." Research Disclosure, Article 422122, Jun. 1999, pp. 886.

Mascarenhas, E., F. Knop, R. Pasquini, and V. Rego. "Checkpoint and Recovery Methods in the ParaSol Simulation System". Proceedings. 1997 Winter Simulation Conference. Published: San Diego, CA, 1997. pp. 452–459. (Abstract).

Triantafillou, P. and D. Taylor. "Efficiently Maintaining Availability in the Presence of Partitionings in Distributed Systems." Proceedings. Seventh International Conference on Data Engineering (Cat. No. 91CH2968–6), Published: Los Alamitos, CA, 1991. pp. 34–41. (Abstract).

Triantafillou, P. and D.J. Taylor. "VELOS: A New Approach for Efficiently Achieving High Availability in Partitioned Distributed Systems." *IEEE Transactions on Knowledge and Data Engineering*, vol. 8, No. 2 Apr. 1996. pp 305–321. (Abstract).

Yew, Huey Liu, L.M. Ni, and C.F.E. Wu. "Application Data Checkpointing for Multi–Threaded UNIX systems." 1994 International Computer Symposium Conference Proceedings, vol. 1, Published: Hsinchu, Taiwan, 1994. pp. 173–178.

\* cited by examiner

| File Type | Backup Priority |
|---|---|
| System Configuration Files | 1 |
| File Allocation Table | 1 |
| Database program | 2 |
| Database Tables | 3 |
| User Group 1 Data files | 4 |
| User Group 2 data files | 5 |
| | |

Backup Priority Table

METHOD, SYSTEM, AND PROGRAM FOR MAINTAINING BACKUP COPIES OF FILES IN A BACKUP STORAGE DEVICE

BACKGROUND OF THE INVENTION

1. Field of the Invention

The present invention relates to a method, system, and program for maintaining backup copies of files in a backup storage device.

2. Description of the Related Art

In a client/server environment, a backup program, such as the International Business Machines Corporation (IBM) Tivoli Storage Management backup program,** maintains an image of the data and programs on a file server at a secondary storage, such as on tape cartridges. In the event of a system failure or other event that results in a loss of data on the file server, the backup program may be used to restore the data and programs from the tape cartridges to the file server.

One noticeable problem with such backup programs is the time required to perform the restore operation. In large network environments where multitudes of clients access the file server, the image of the file server may comprise several terabytes (one trillion bytes) of data. For such large file servers, the backup program can take one or more days to restore the entire image, i.e., all the programs and data, from the tape cartridges to the file server. Thus, the clients may not be able to access the file server for an extended period of time while the restore operation is performed.

One solution to optimize the restore operation is to utilize multiple tape drives to allow the files to be restored from multiple tape drives in parallel. Notwithstanding, for large file servers, the restoration time when several terabytes or more are involved can still extend an entire day.

Thus, there is a need in the art for improved techniques to operate a backup program in a manner that minimizes the time that the data is unavailable to the users during a restore operation.

SUMMARY OF THE PREFERRED EMBODIMENTS

Provided is a system, method, and program for maintaining a backup copy of files in a primary storage device in a backup storage device. The files in the primary storage device are capable of being restored from the backup copy of the files in the backup storage device. An association of one of a plurality of priority values is maintained for each file in the backup copy in the backup storage device. The priority value associated with each file in the backup copy of the files is used to determine the order in which the files in the backup copy are restored from the backup storage device to the primary storage device.

In further implementations, after files associated with one priority value are restored, the restored files are available for access before files associated with a lower priority value are restored.

Still further, the priority value associated with each file in the backup copy of the files may be used to determine the order in which the files in the primary storage device are written to the backup copy in the backup storage device.

In yet further implementations, using the priority value to determine the order in which the files in the primary storage device are written to the backup copy in the backup storage device further comprises performing for each priority value determining all files in the primary storage device to backup having the priority value and writing all the determined files having the priority value to the backup storage device before writing files having a lower priority value to the backup storage device.

Moreover, one priority value is capable of being associated with at least one of an operating system file, system configuration file, application program file, data file related to one application program, and files used by a group of users.

The described implementations provide a technique for associating a priority value with files to backup in a backup storage device that may be used to optimize the manner in which data is restored and reduce the time during which data is unavailable for use during a restore operation from the backup storage device.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
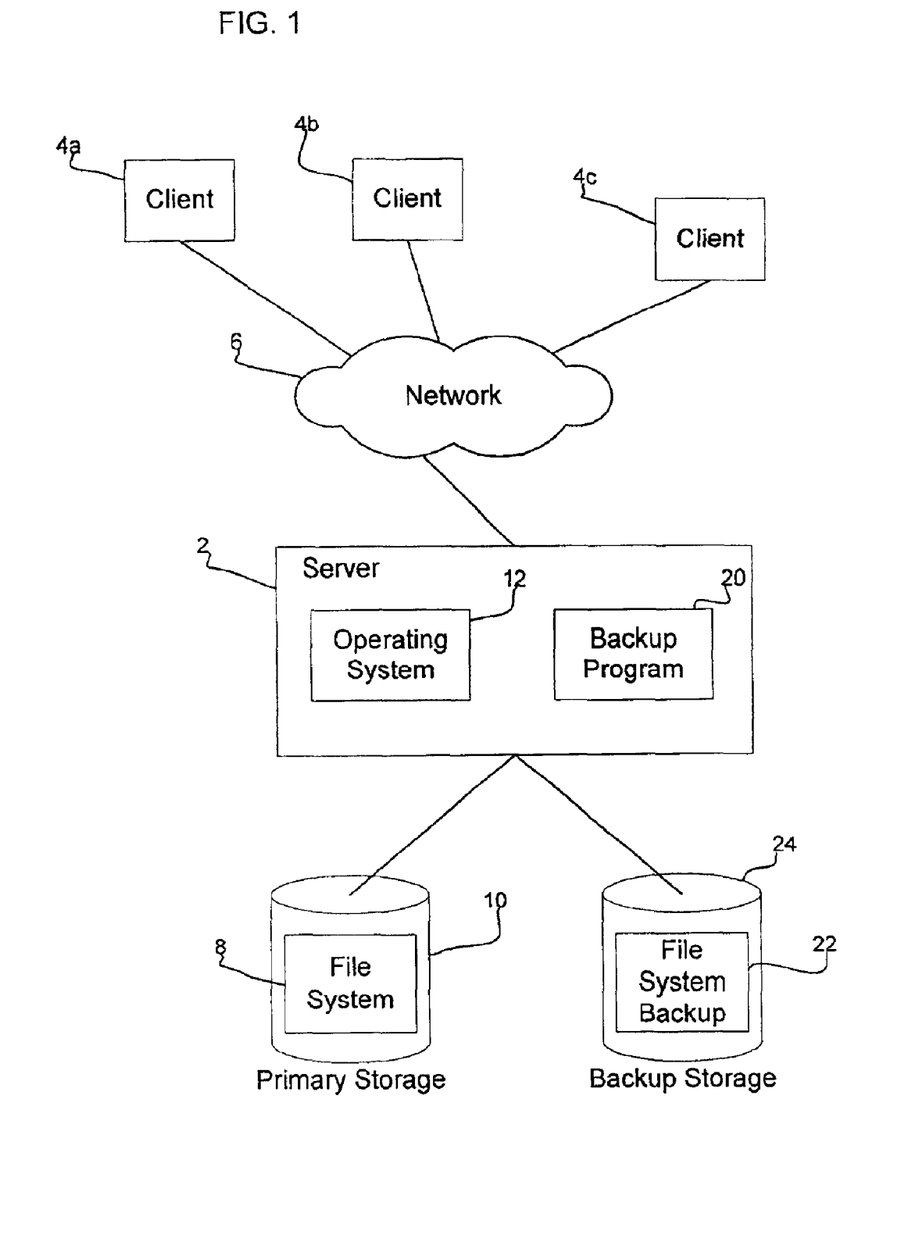
FIG. 1 illustrates a computing environment in which described implementations are realized.

FIG. 1 illustrates a computing environment in which described implementations may be realized. A server 2 is in communication with multiple client computers 4a, b, c over a network 6. The network 6 may comprise any network known in the art, such as the Internet, an Intranet, a Fibre Channel network, Storage Area Network (SAN), Local Area Network (LAN), etc. The server 2 maintains a file system 8 in a primary storage system 10, which may comprise any storage system known in the art, such as a one or more hard disk drives, a Direct Access Storage Device (DASD), Just a Bunch of Disks (JBOD), a Redundant Array of Independent Disks (RAID), tape library, optical library, etc. The server 2 includes an operating system 12 capable of managing requests from multiple clients 4a, b, c for programs and data maintained in the file system 8. The operating system 12 may comprise any server oriented operating system known in the art, such as the IBM OS/390, AIX, Microsoft Windows NT, etc. The server 2 may comprise one or more server class computers. The clients 4a, b, c may comprise any computing device known in the art, such as a server class machine, a mainframe, desktop computer, laptop computer, hand held computer, telephony device, etc.

The server 2 further includes a backup program 20 that maintains a backup copy of the file system 22, including applications and/or data, in a backup storage 24. The backup program may include the functionality of any backup program known in the art, such as the IBM Tivoli Storage Management backup program, in addition to the functionality of the described implementations. The backup storage 24 may comprise any suitable secondary storage device for maintaining a backup copy of data, such as a tape storage system comprised of one or more tape drives and tape cartridges, an optical disk library, etc. The server 2 may communicate with the primary storage 10 and backup storage 24 via any interface known in the art, such as a backplane interface in the server 2, parallel ports, serial ports, a Small Computer System Interface (SCSI), a Fibre Channel arbitrated loop, a network, or any other interface known in the art.

Figure 2:
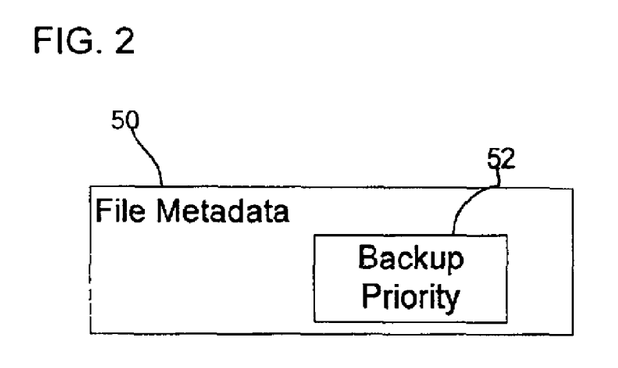
FIG. 2 illustrates a data structure implementation of how the priority values may be maintained for files in accordance with implementations of the invention.

In the described implementations, the backup program 24 would include the capability to allow an administrator to assign a backup priority to all files, directories or file groups in the file system 8 maintained in the file system backup 22. File groups may be associated with users or applications. FIG. 2 illustrates how file metadata 50, which may comprise the metadata maintained with files as part of the file system, includes a backup priority field 52 indicating a backup priority of the file.

Figure 3:
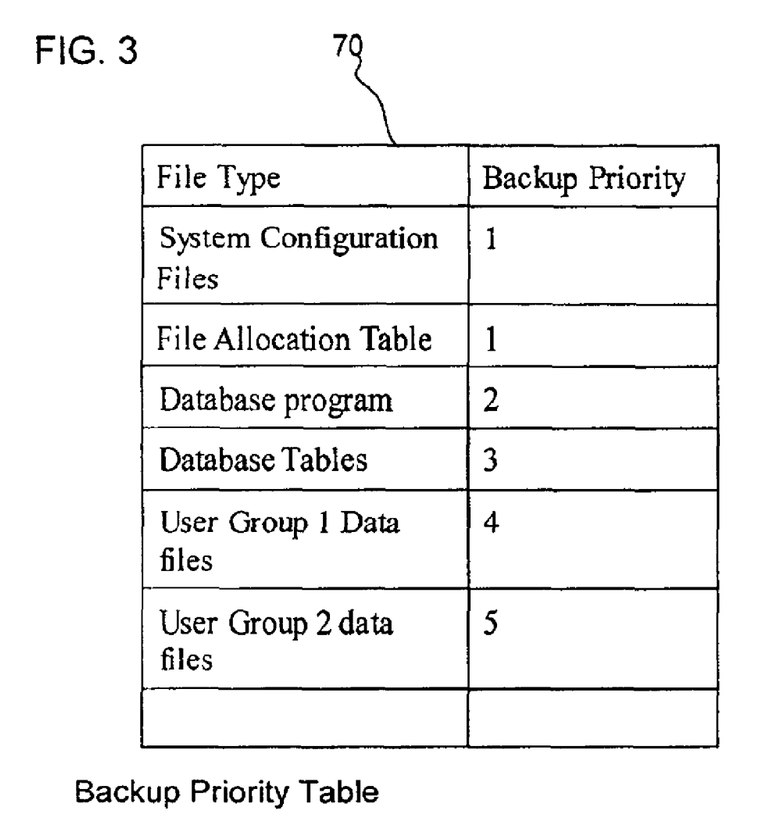
FIG. 3 illustrates a data structure implementation of how the priority values are associated with different types of files in accordance with implementations of the invention.

FIG. 3 illustrates a backup priority table 70 maintained by the backup program 20 that associates different types of files or specific files with different backup priority values. For instance, the system configuration files and the file allocation table, which must be restored before anything else can run, have the highest backup priority and are restored first. A database application program and database tables, which may be needed by many of the clients 4a, b, c, have the next highest priority values, and are the next group of files restored. In the described implementations, the clients 4a, b, c have access to files associated with a backup priority value that have been restored and before files associated with lower backup priority values are restored. This reduces the time files are unavailable as a result of a restore operation.

The backup program 20 may further use these priority values to determine the order in which files in the file system 8 are written (backed-up) to the file system backup 22 in the backup storage 24. The backup priority table 70 may associate backup priorities for different file name extensions or specific file names or any portion of a file name. Still further, priority may be assigned to files based on the user creating or modifying a file. Thus, if a member of user group 1 creates or modifies a file, then that file is assigned the backup priority of four corresponding to the user group 1 in the backup priority table 70. Yet further, priority can be assigned by a last usage time, such that files used more recently have higher priority than files relatively less recently used, i.e., files not used in a long time for some user or file type/extension.

Figure 4:
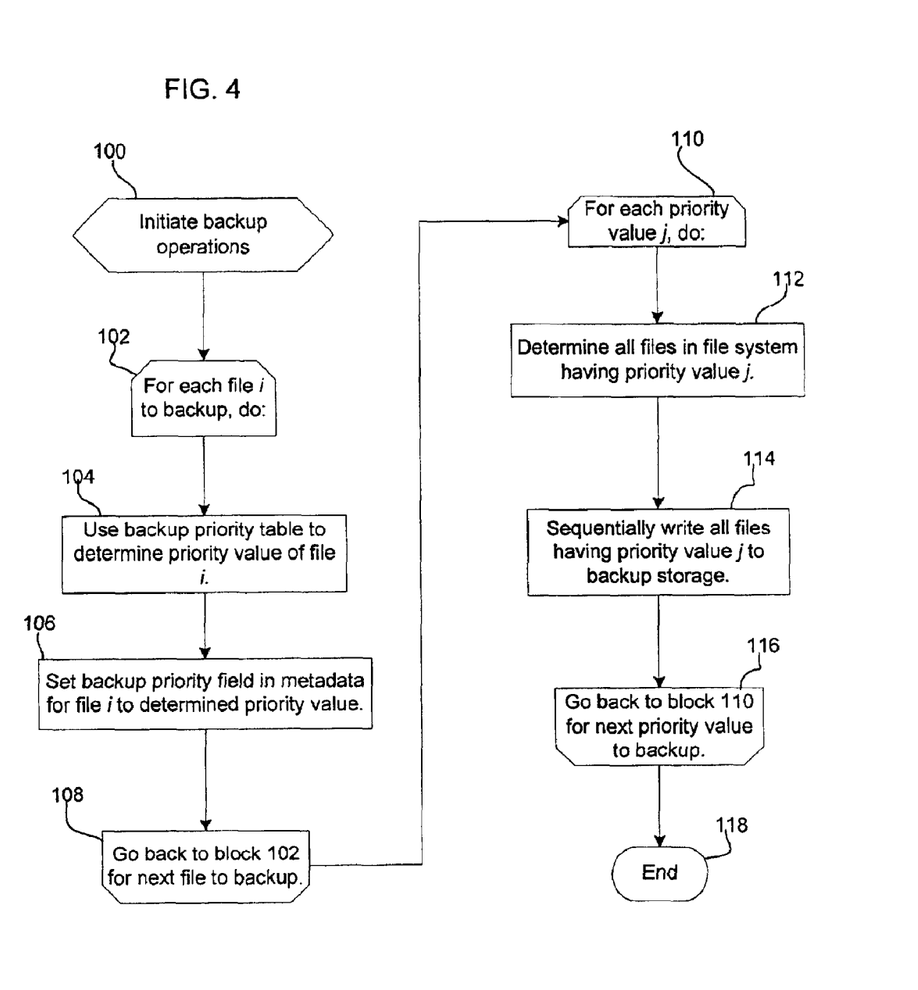
FIG. 4 illustrates logic used to backup files from a primary storage device to a secondary storage device in accordance with implementations of the invention.

In one implementation, the backup program 20 assigns the backup priority values to files when backing up the data. FIG. 4 illustrates logic implemented in the backup program 20 to assign backup priority values to files as they are being written to the file system backup 22 as part of a backup operation. Control begins at block 100 with the backup operation being invoked. At blocks 102 through 108 a loop is performed for each file i in the file system 8 subject to the backup operation, where each file i may comprise an operating system file, application program file, or data file. At block 104, the backup program 20 uses the backup priority table 70 to determine the priority value for file i. This may be determined from the filename extension, file name, user that created or last modified file i, etc. The metadata 50 for file i would indicate the user or user group that created or last modified file i. The backup program 20 would then set the backup priority field 52 in the metadata 50 for file i to the determined priority value indicated in the backup priority table 70. In alternative implementations, the operating system 12 may include code to use the backup priority table 70 to set the backup priority field 52 in the file metadata 50 whenever a file is created or modified, i.e., a write operation is performed with respect to the file in the file system 8. In such alternative implementations, the backup program 20 would not have to perform the logic at steps 102 through 108.

Blocks 110 through 116 of FIG. 4 illustrate logic implemented in the backup program 20 to backup the data in the backup storage 22 using the priority value maintained for the files, such as the backup priority field 52 in the metadata 50. The backup program 20 performs the steps at blocks 110 through 116 for each priority value j indicated in the backup priority table 70, starting from the highest priority value to the lowest priority value. At block 112, the backup program 20 determines all files in the file system 8 having backup priority value j. The backup program 20 then sequentially writes all the determined files having backup priority value j to the backup storage 24.

Figure 5:
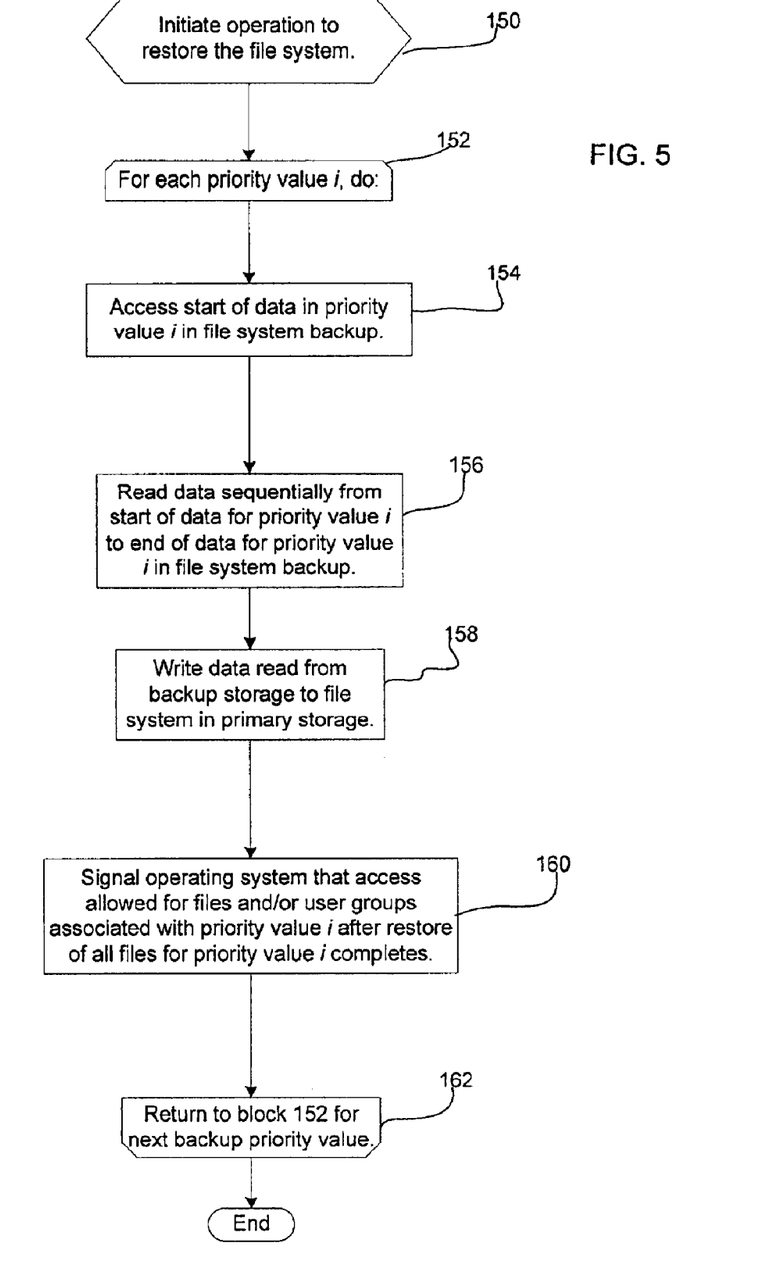
FIG. 5 illustrates logic used to restore files from the backup storage device in accordance with implementations of the invention.

The backup operation performed with respect to blocks 110 through 116 may apply to a full backup operation or an incremental backup operation. FIG. 5 illustrates logic implemented in the backup program 20 to restore files from the file system backup 22 in the backup storage 24. The restore operation may be performed in response to an error recovery or system failure operation, or in the event that data is lost as a result of a failure in the primary storage 10. Control begins at block 150 with the backup program 20 initiating an operation to restore the file system 8 in the primary storage 10 from the file system backup 22 in the backup storage 24. The backup program 20 performs a loop at blocks 152 through 162 for each priority value i. At block 154 the backup program 20 accesses the start of the data for priority value i in the backup storage 22. The backup program 20 then sequentially reads (at block 156) the data for priority value i from the backup storage 24 to the end of the priority value i data in the backup storage 20. The backup program 20 writes (at block 158) the data retrieved from the backup storage 24 to the file system 8 in the primary storage 10 to restore the data for priority value i to the file system 8.

In the implementations described with respect to FIG. 4, the backup program 20 writes data from each priority value sequentially to the backup storage 24. This optimizes the retrieval of the data for a priority value from the backup storage 22 because the backup storage 24 device does not need to seek to another location on the storage medium to read data sets for the same priority value. For instance, if the backup storage 24 medium is a magnetic tape medium, sequential read operations avoid the need to perform the substantially time consuming seek operations to different locations on the tape. The same is true for hard disk drives, because if the magnetic head is reading data sequentially, it does not have to seek to another track to read further files for the current priority value being restored. Thus, writing data for a priority value i sequentially to the storage medium of the backup storage 24 minimizes the time needed to retrieve the data from the secondary storage medium during the restore operation.

In alternative implementations, especially the case if incremental backup operations are used to backup the file system 8, the data associated with a given priority value may be stored in groups of sequential data sets, where each group is at different non-sequential locations in the backup storage 24. In such case, in order to read all the data for a given priority value, the backup program 20 would have to seek to different non-sequential locations in the backup storage 24 to retrieve all the data for a priority value i.

After restoring all the data for a given priority value i, the backup program 20 then signals the operating system 12 that data of the type having the priority value i is available for access. The operating system 12 may then make such restored data available to any users of the data or to any group of users associated with the restored priority value. In this way, clients 4a, b, c will have access to the data for a restored priority value before data having a subsequent backup priority value is restored. Thus, users needing access to fields of the higher priority value i do not have to wait until the entire file system 8 is restored, including files associated with lower priority values. This arrangement is particularly advantageous for file systems that are several terabytes in size. In fact, those needing files having the earliest priority value may have access to the data after a couple of hours, as opposed to twenty or more hours. This faster access to restore data is particularly important for critical data, such as database applications.

As discussed a systems administrator may consider many factors in determining which priority value to assign to different files. The critical operating system and configuration files, or foundation files, must obviously be restored first in order for the system to operate and, hence, have the highest priority value. However, after such foundational files are restored, the systems administrator must choose applications, application data, and users to prefer. For instance, if the clients 4a, b, c are primarly interested in accessing a database, then the system administrator would assign a high priority value to the database application program. The system administrator may also distinguish the priority of the user database data for different users. For instance, those users who pay a premium fee for accessing the data, such as the case with certain data services offered over the Internet, such as financial information, technical information, etc., would have their data files assigned a higher backup priority value over users paying less or no fees. This allows the system administrator to ensure that the more premium members have the soonest access to their data following a restore operation. In the case of an on-line banking system, the user checking account data may be restored first to allow customers immediate electronic access as soon as possible to their bank accounts through Automated Teller Machines (ATM) or computers using the Internet. Moreover, the data used by certain employees having more critical tasks may be restored first over employees whose need for access is less critical.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the backup program was maintained in a server that provided access for multiple clients to a file system in the server. In alternative implementations, the backup program may be used to backup files on a standalone system that is not within a client/server environment. Additionally, the files can be backed-up to intermediate storage in an order that optimizes backup time, and then rearranged on the backup media in an order that optimizes restore time by the backup/restore priority.

The described implementations mentioned that priority may be assigned based on whether the files are operating system files, specific application program files, files generated by a particular group of users, etc. Additionally, other factors or attributes related to the files may be used to determine their priority value.

In the described implementations, files having a same priority are sequentially written to the backup storage. Additional criteria may be used within a priority value to determine the order in which files having a same backup priority value are written to storage. For instance, files having the most recent modification date for a priority value may be written first to storage. In the described implementations, files having a given priority value are sequentially written to storage to optimize the retrieval of data within a priority value from backup storage. In alternative implementations, the files with the same priority may be written in patterns other than sequential if such alternative patterns will optimize the retrieval of the files for a priority from the backup storage.

Moreover, groups of files of given backup priority value may be stored in a pattern in the backup storage that would optimize their retrieval during a restore operation. For instance, for a tape drive, the file groups of different priority values may be written in sequential order according to their priority so that the files of a next priority value may be accessed as quickly as possible after writing all the files for the current priority value.

In the described implementations, the backup priority value was maintained with metadata in the files as stored in the file system 8 and in the file system backup 22. Alternatively, the backup program 20 may maintain a separate table for associating priority with the files and may not include such priority information with the metadata for the files as stored in the primary storage 8 or in the backup storage 24.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

WINDOWS is a registered trademark of Microsoft Corporation; AIX, OS/390, and Tivoli are registered trademarks of International Business Machines Corporation.

What is claimed is:

1. A method for maintaining a backup copy of files in a primary storage device in a backup storage device, wherein the files in the primary storage device are capable of being restored from the backup copy of the files in the backup storage device, comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein files of similar priority values are located proximate to one another when backed-up in the storage device to optimize restore time.

2. The method of claim 1, wherein after files associated with one priority value are restored, the restored files are available for access before files associated with a lower priority value are restored.

3. The method of claim 1, further comprising:

determining the priority value for each file from a priority table associating priority values with files; and writing the priority value for each file to metadata maintained for each file.

4. The method of claim 1, further comprising:

using the priority value associated with each file in the backup copy of the files to determine the order in which the files in the primary storage device are written to the backup copy in the backup storage device.

5. The method of claim 1, wherein one priority value is capable of being associated with at least one of an operating system file, system configuration file, application program file, data file related to one application program, and files used by a group of users.

6. The method of claim 1, wherein using the priority value associated with each file in the backup copy of the files to determine the order in which the files in the backup copy are restored from the backup storage device to the primary storage device further comprises performing for each priority value from a highest to lowest:

reading and restoring all the files in the backup copy in the backup storage device associated with the priority value before reading and restoring files associated with a subsequent priority value.

7. The method of claim 6, wherein files having the same priority value are sequentially read from the backup storage device.

8. The method of claim 1, wherein files needed for a computer to operate have a higher priority than files not needed for the computer to operate.

9. A method for maintaining a backup copy of files in a primary storage device in a backup storage device, wherein the files in the primary storage device are capable of being restored from the backup copy of the files in the backup storage device, comprising:

maintaining an association of one of a plurality of priority values for each file in the backup copy in the backup storage device;

determining the priority value for each file from a priority table associating priority values with files;

writing the priority value for each file to metadata maintained for each file, wherein the priority value is determined and written to the metadata whenever data is written to the file in the primary storage device; and using the priority value associated with each file in the backup copy of the files to determine the order in which the files in the backup copy are restored from the backup storage device to the primary storage device.

10. A method for maintaining a backup copy of files in a primary storage device in a backup storage device, wherein the files in the primary storage device are capable of being restored from the backup copy of the files in the backup storage device, comprising:

maintaining an association of one of a plurality of priority values for each file in the backup copy in the backup storage device;

determining the priority value for each file from a priority table associating priority values with files;

writing the priority value for each file to metadata maintained for each file, wherein the priority value is determined and written to the metadata when performing a backup operation of the files in the primary storage device to the backup copy in the backup storage device; and using the priority value associated with each file in the backup copy of the files to determine the order in which the files in the backup copy are restored from the backup storage device to the primary storage device.

11. A method for maintaining a backup copy of files in a primary storage device in a backup storage device, wherein the files in the primary storage device are capable of being restored from the backup copy of the files in the backup storage device, comprising:

(i) maintaining an association of one of a plurality of priority values for each file in the backup copy in the backup storage device;

(ii) using the priority value associated with each file in the backup copy of the files to determine the order in which the files in the primary storage device are written to the backup copy in the backup storage device by;

(A) determining all files in the primary storage device to backup having the priority value; and (B) writing all the determined files having the priority value to the backup storage device before writing files having a lower priority value to the backup storage device; and (iii) using the priority value associated with each file in the backup copy of the files to determine the order in which the files in the backup copy are restored from the backup storage device to the primary storage device.

12. The method of claim 11, wherein the determined files having the priority value are sequentially written to the backup storage device.

13. The method of claim 12, wherein the backup storage device comprises a tape storage medium.

14. The method of claim 12, wherein files of one priority are written sequentially to the backup storage device after files having higher priority values are sequentially written to the backup storage device.

15. A method for maintaining a backup copy of files in a primary storage device in a backup storage device, wherein the files in the primary storage device are capable of being restored from the backup copy of the files in the backup storage device, comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein one priority value is capable of being associated with at least one of an operating system file, system configuration file, application program file, data file related to one application program, and files used by a group of users, wherein the operating system and system configuration files that are needed in order for the computer to operate have a highest priority and the files associated with one critical application program have a next highest priority.

16. A method for maintaining a backup copy of files in a primary storage device in a backup storage device, wherein the files in the primary storage device are capable of being restored from the backup copy of the files in the backup storage device, comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein one priority value is capable of being associated with at least one of an operating system file, system configuration file, application program file, data file related to one application program, and files used by a group of users, wherein files used by different groups of users have different priority values, wherein one group of users associated with files having a higher priority value are capable of accessing the files restored from the backup copy before groups of users associated with files having a lower priority value.

17. A method for maintaining a backup copy of files in a primary storage device in a backup storage device, wherein the files in the primary storage device are capable of being restored from the backup copy of the files in the backup storage device, comprising:

(i) maintaining an association of one of a plurality of priority values for each file in the backup copy in the backup storage device; and (ii) using the priority value associated with each file in the backup copy of the files to determine the order in which the files in the backup copy are restored from the backup storage device to the primary storage device by performing for each priority value from a highest to lowest;

(A) reading and restoring all the files in the backup copy in the backup storage device associated with the priority value before reading and restoring files associated with a subsequent priority value, wherein files having the same priority value are sequentially read from the backup storage device; and (B) after reading and restoring all the files in the backup copy having the priority value, generating a signal to indicate that the files read and restored are available for access before files in the backup copy having a lower priority are read and restored.

18. A system for backing up files, comprising:

(i) a primary storage device;

(ii) a backup storage device maintaining a backup copy of files in the primary storage device;

(iii) means for restoring the files in the primary storage device from the backup copy of the files in the backup storage device;

(iv) means for maintaining an association of one of a plurality of priority values for each file in the backup copy in the backup storage device; and (v) means for using the priority value associated with each file in the backup copy of the files to determine the order in which the files in the primary storage device are written to the backup copy in the backup storage device, wherein the means for using the priority value to determine the order in which the files in the primary storage device are written to the backup copy in the backup storage device further performs for each priority value:

(A) determining all files in the primary storage device to backup having the priority value; and (B) writing all the determined files having the priority value to the backup storage device before writing files having a lower priority value to the backup storage device; and (vi) means for using the priority value associated with each file in the backup copy of the files to determine the order in which the files in the backup copy are restored from the backup storage device to the primary storage device.

19. The system of claim 18, wherein after files associated with one priority value are restored, the restored files are available for access before files associated with a lower priority value are restored.

20. The system of claim 18, further comprising:

means for determining the priority value for each file from a priority table associating priority values with files; and means for writing the priority value for each file to metadata maintained for each file.

21. The system of claim 18, wherein one priority value is capable of being associated with at least one of an operating system file, system configuration file, application program file, data file related to one application program, and files used by a group of users.

22. The system of claim 18, wherein the means for using the priority value associated with each file in the backup copy of the files to determine the order in which the files in the backup copy are restored from the backup storage device to the primary storage device further performs for each priority value from a highest to lowest:

reading and restoring all the files in the backup copy in the backup storage device associated with the priority value before reading and restoring files associated with a subsequent priority value.

23. The system of claim 18, wherein files needed for a computer to operate have a higher priority than files not needed for the computer to operate.

24. A system for backing up files, comprising:

a primary storage device;

a backup storage device maintaining a backup copy of files in the primary storage device;

means for restoring the files in the primary storage device from the backup copy of the files in the backup storage device;

means for maintaining an association of one of a plurality of priority values for each file in the backup copy in the backup storage device; and means for using the priority value associated with each file in the backup copy of the files to determine the order in which the files in the backup copy are restored from the backup storage device to the primary storage device, wherein one priority value is capable of being associated with at least one of an operating system file, system configuration file, application program file, data file related to one application program, and files used by a group of users, and wherein files used by different groups of users have different priority values, wherein one group of users associated with files having a higher priority value are capable of accessing the files restored from the backup copy before groups of users associated with files having a lower priority value.

25. A system for backing up files, comprising:
(i) a primary storage device;
(ii) a backup storage device maintaining a backup copy of files in the primary storage device;
(iii) means for restoring the files in the primary storage device from the backup copy of the files in the backup storage device;
(iv) means for maintaining an association of one of a plurality of priority values for each file in the backup copy in the backup storage device; and
(v) means for using the priority value associated with each file in the backup copy of the files to determine the order in which the files in the backup copy are restored from the backup storage device to the primary storage device, wherein the means for using the priority value further performs for each priority value from a highest to lowest:
(A) reading and restoring all the files in the backup copy in the backup storage device associated with the priority value before reading and restoring files associated with a subsequent priority value, wherein files having similar priority values are located more proximate to one another than files having less similar priority values when backed-up in the storage device in order to optimize restore time by the priority values.

26. The system of claim 25, further comprising:
means for using the priority value associated with each file in the backup copy of the files to determine the order in which the files in the primary storage device are written to the backup copy in the backup storage device.

27. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:
maintaining an association of one of a plurality of priority values for each file in the backup copy in the backup storage device; and
using the priority value associated with each file in the backup copy of the files to determine the order in which the files in the backup copy are restored from the backup storage device to the primary storage device, wherein files of similar priority values are located proximate to one another when backed-up in the storage device to optimize restore time.

28. The article of manufacture of claim 27, wherein after files associated with one priority value are restored, the restored files are available for access before files associated with a lower priority value are restored.

29. The article of manufacture of claim 27, further comprising:
determining the priority value for each file from a priority table associating priority values with files; and
writing the priority value for each file to metadata maintained for each file.

30. The article of manufacture of claim 27, further comprising:
using the priority value associated with each file in the backup copy of the files to determine the order in which the files in the primary storage device are written to the backup copy in the backup storage device.

31. The article of manufacture of claim 27, wherein one priority value is capable of being associated with at least one of an operating system file, system configuration file, application program file, data file related to one application program, and files used by a group of users.

32. The article of manufacture of claim 27, wherein using the priority value associated with each file in the backup copy of the files to determine the order in which the files in the backup copy are restored from the backup storage device to the primary storage device further comprises performing for each priority value from a highest to lowest:
reading and restoring all the files in the backup copy in the backup storage device associated with the priority value before reading and restoring files associated with a subsequent priority value.

33. The article of manufacture of claim 32, wherein files having the same priority value are sequentially read from the backup storage device.

34. The article of manufacture of claim 27, wherein files needed for a computer to operate have a higher priority than files not needed for the computer to operate.

35. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:
maintaining an association of one of a plurality of priority values for each file in the backup copy in the backup storage device;
determining the priority value for each file from a priority table associating priority values with files;
writing the priority value for each file to metadata maintained for each file, wherein the priority value is determined and written to the metadata whenever data is written to the file in the primary storage device; and
using the priority value associated with each file in the backup copy of the files to determine the order in which the files in the backup copy are restored from the backup storage device to the primary storage device.

36. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:
maintaining an association of one of a plurality of priority values for each file in the backup copy in the backup storage device;

determining the priority value for each file from a priority table associating priority values with files;

writing the priority value for each file to metadata maintained for each file, wherein the priority value is determined and written to the metadata when performing a backup operation of the files in the primary storage device to the backup copy in the backup storage device; and using the priority value associated with each file in the backup copy of the files to determine the order in which the files in the backup copy are restored from the backup storage device to the primary storage device.

37. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:

(i) maintaining an association of one of a plurality of priority values for each file in the backup copy in the backup storage device;

(ii) using the priority value associated with each file in the backup copy of the files to determine the order in which the files in the primary storage device are written to the backup copy in the backup storage device by:

(A) determining all files in the primary storage device to backup having the priority value; and (B) writing all the determined files having the priority value to the backup storage device before writing files having a lower priority value to the backup storage device; and (iii) using the priority value associated with each file in the backup copy of the files to determine the order in which the files in the backup copy are restored from the backup storage device to the primary storage device.

38. The article of manufacture of claim 37, wherein the determined files having the priority value are sequentially written to the backup storage device.

39. The article of manufacture of claim 38, wherein files of one priority are written sequentially to the backup storage device after files having higher priority values are sequentially written to the backup storage device.

40. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:

maintaining an association of one of a plurality of priority values for each file in the backup copy in the backup storage device, wherein the backup storage device comprises a tape storage medium; and using the priority value associated with each file in the backup copy of the files to determine the order in which the files in the backup copy are restored from the backup storage device to the primary storage device.

41. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein one priority value is capable of being associated with at least one of an operating system file, system configuration file, application program file, data file related to one application program, and files used by a group of users, wherein the operating system and system configuration files that are needed in order for the computer to operate have a highest priority and the files associated with one critical application program have a next highest priority.

42. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein one priority value is capable of being associated with at least one of an operating system file, system configuration file, application program file, data file related to one application program, and files used by a group of users, wherein files used by different groups of users have different priority values, wherein one group of users associated with files having a higher priority value are capable of accessing the files restored from the backup copy before groups of users associated with files having a lower priority value.

43. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:

(i) maintaining an association of one of a plurality of priority values for each file in the backup copy in the backup storage device; and (ii) using the priority value associated with each file in the backup copy of the files to determine the order in which the files in the backup copy are restored from the backup storage device to the primary storage device by performing for each priority value from a highest to lowest:

(A) reading and restoring all the files in the backup copy in the backup storage device associated with the priority value before reading and restoring files associated with a subsequent priority value; and (B) after reading and restoring all the files in the backup copy having the priority value, generating a signal to indicate that the files read and restored are available for access before files in the backup copy having a lower priority are read and restored.

44. A method for maintaining a backup copy of files in a primary storage device in a backup storage device, wherein the files in the primary storage device are capable of being restored from the backup copy of the files in the backup storage device, comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein the priority values are stored in the backup copy.

45. A system for backing up files, comprising:

a primary storage device;

a backup storage device maintaining a backup copy of files in the primary storage device;

means for restoring the files in the primary storage device from the backup copy of the files in the backup storage device;

means for maintaining an association of one of a plurality of priority values for each file in the backup copy in the backup storage device; and means for using the priority value associated with each file in the backup copy of the files to determine the order in which the files in the backup copy are restored from the backup storage device to the primary storage device, wherein the priority values are stored in the backup copy.

46. An article of manufacture including code for maintaining a backup copy of files in a primary storage device in a backup storage device, wherein the files in the primary storage device are capable of being restored from the backup copy of the files in the backup storage device, wherein the code causes operations to be performed, the operations comprising:

maintaining an association of one of a plurality of priority values for each file in the backup copy in the backup storage device; and using the priority value associated with each file in the backup copy of the files to determine the order in which the files in the backup copy are restored from the backup storage device to the primary storage device, wherein the priority values are stored in the backup copy.

* * * * *